Aug. 19, 1930.   F. L. SCHADE   1,773,603
MOLD FOR EDIBLE ARTICLES
Filed Jan. 27, 1930
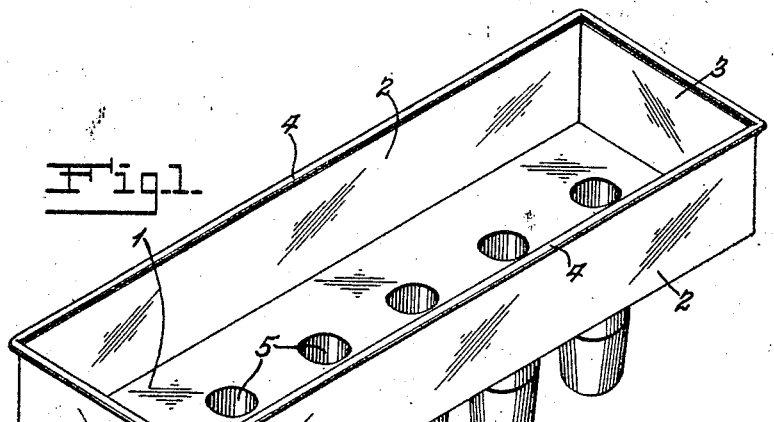
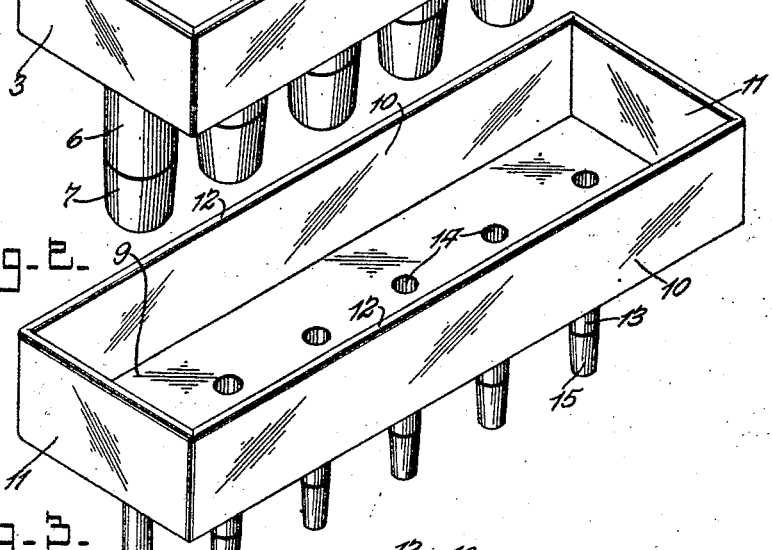
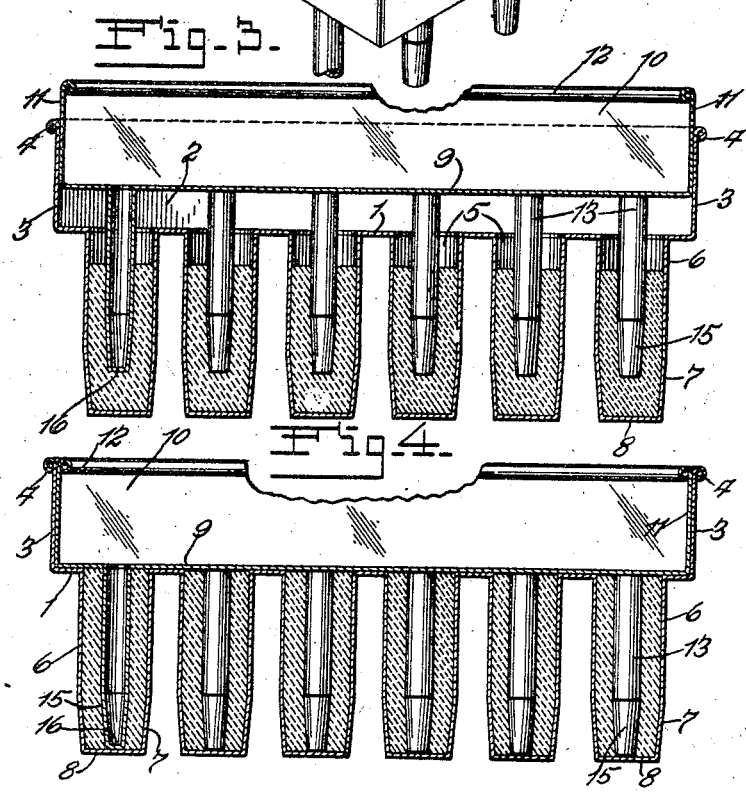
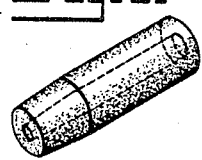
Inventor
Floyd L. Schade,
by Rippey & Kingsland.
His Attorneys.

Patented Aug. 19, 1930

1,773,603

UNITED STATES PATENT OFFICE

FLOYD L. SCHADE, OF ST. LOUIS, MISSOURI

MOLD FOR EDIBLE ARTICLES

Application filed January 27, 1930. Serial No. 423,572.

This invention relates to molds for use in making edible articles; and an object is to provide a mold for use in making edible articles comprising a hollow outer portion and a core enclosed within the outer portion, which may consist of a substance of the same general class as the outer portion and having a different flavor, or may consist of a different substance.

Another object of the invention is to provide an improved mold for use in making frozen confections consisting of a frozen hollow outer portion and a core filling the inside of the outer portion and consisting either of a frozen substance or of any other desired material and which is kept confined by the frozen outer portion of the article.

Other objects of the invention are to provide an improved mold for use in the manufacture or production of confections and including a receptacle supporting and opening into a number of appropriately shaped molds; in combination with a device arranged to telescope within said receptacle and supporting a number of core members arranged to be extended into the substance in said molds, so as to shape said substance into hollow form, and to maintain said substance in hollow form during the operation of solidifying the substance in the molds; to arrange said parts in such cooperative form and relationship that the cores may be readily projected into the substance in the molds and retained in such position until the substance has been solidified, and may then be withdrawn; to construct the molds in such a way that after the core members are withdrawn the cavities in the articles contained in the molds may be filled with another substance while the articles remain in a solidified condition in the molds; and also to construct the device in such a way that the finished articles may readily be withdrawn, removed or discharged from the molds.

Other objects will appear from the following description, reference being made to the accompanying drawing, in which—

Fig. 1 is a perspective view of the combined receptacle and mold supporting member, and the molds in connection therewith.

Fig. 2 is a perspective view showing the co-operating core supporting member and the core elements in connection therewith.

Fig. 3 is a vertical longitudinal sectional view showing the mold member with the molds having therein the substance to be molded to form the hollow outside portions of the articles, and also showing the core member in an intermediate position.

Fig. 4 is a similar vertical longitudinal sectional view showing the mold and core members in their final cooperative adjustments.

Fig. 5 is a perspective view of a hollow article formed and shaped by cooperation of the mold and core members.

Fig. 6 is a similar perspective view of an article comprising the hollow member of Fig. 5 enclosing a core of a different flavor.

The receptacle which supports the molds and which receives the material to be molded and discharges the material into the molds, and which controls the operation of the core member, comprises a bottom wall 1, vertical longitudinal side walls 2 having their lower edges imperviously united with the longitudinal edges of the bottom wall 1, and vertical end walls 3 having their lower edges imperviously united with the ends of the bottom wall 1 and their vertical side edges imperviously united with the ends of the side walls 2. These walls may be made of any appropriate material. As shown, these walls are made of sheet metal and have their upper edges shaped to provide external beads 4 which perform the double function of strengthening the walls and serving as ledges or flanges to be engaged by the hands or fingers of the operator in handling the device. The bottom wall 1 has therethrough a series of holes 5 which open into the molds.

In the embodiment of the invention shown, the molds comprise metallic walls 6 having tapered portions 7 at their lower ends and lower end walls 8 imperviously united with the lower ends of the tapered portions 7. The upper ends of the mold walls 7 are imperviously united with the bottom wall 1 around the respective holes 5. Thus, the area of each hole 5 is at least equal to the crosssectional area of the upper portion of the mold into which said hole opens, so as to facilitate the passage of the material into the molds and the withdrawal of the articles from the molds. The provision of the tapered portions 7 at the closed lower ends of the molds serves a useful purpose; for, by this construction, I am enabled to produce articles that are of substantially uniform diameter for a considerable portion which, as shown, is the greater portion of their length. And the tapered portions 7 facilitate the discharge or removal of the finished articles from the molds, even though for a greater portion of their length the molds and the articles enclosed thereby are of uniform diameter.

The cooperating member of this mold comprises a bottom wall 9, vertical longitudinal side walls 10 having their lower edges imperviously united with the longitudinal edges of the bottom wall 9, and vertical end walls 11 having their lower edges imperviously united with the ends of the bottom wall 9 and having their vertical side edges imperviously united with the ends of the side walls 10. These walls may be made of any appropriate material. As shown, these walls are made of sheet metal and have their upper edges shaped to provide internal beads 12 which perform the double function of strengthening the walls and serving as handles for manipulation of the core member. The bottom wall 9 has attached thereto a number of cores which are arranged to extend concentrically into the molds when this core member is telescoped into the mold member. As shown, each core consists of a hollow sheet metal projection 13. The upper ends of these hollow cores are imperviously attached to the bottom wall 9 and open, through holes 14, into the receptacle or pan of which the bottom wall 9 is a part. At their lower ends, the cores 13 have tapered portions 15 provided with end walls 16 hermetically closing the lower ends of said cores.

A hollow article that may be produced by this device is shown in Fig. 5, and an article comprising a hollow enclosing portion and a core of a different flavor enclosed thereby is shown in Fig. 6.

In operation and use of this device, an appropriate amount of fluid material is placed in the receptacle comprising the bottom wall 1 and caused to enter the several molds 6. While the material is still in a liquid state, the core member of the mold is adjusted and operated so as to extend the cores 13 downwardly into the various molds 6. Should any of the molds 6 contain an excess amount of material, such excess amount will be ejected therefrom and caused to enter one or the other of the remaining molds having insufficient material therein. For the cores 13 displace the excess amount of material from the respective molds and eject such material from the molds containing the excess amount of material, permitting the liquid material to flow to molds containing an insufficient amount. Thus, the amount of material in all of the molds is substantially equalized automatically and as an incident to the application of the core member. This flowing of the liquid material into the different molds 6 is permitted so long as the bottom wall 9 has not reached the bottom wall 1. And it is impossible for the bottom wall 9 to reach the bottom wall 1 while material is flowing over the bottom wall 1 from one to another of the molds. Accordingly, the equalizing of the material in the molds is automatically obtained. The core member is telescoped within the mold member, as shown in Figs. 3 and 4, and is thereby automatically adjusted so the cores 13 are concentric with the molds 6. After the parts are adjusted in this way, the device is maintained in this adjustment until the material in the different cores is solidified. In making ice-cream, for instance, the parts are maintained in this adjustment until the material has been frozen to produce hollow ice-cream bodies of any desired shape and size. Then, if there is any adhesion of the cores to the frozen substance in the molds, the cores may be slightly heated to break such adhesion and permit the core member to be withdrawn without withdrawing the hollow solidified articles from the molds. And, if desired, the hollow solidified articles may be withdrawn from the molds and used. Or, if desired, the cavities in the hollow solidified articles may be filled with a substance of a different flavor while said articles remain in the molds. If it is desired to fill the cavities with ice-cream of a different flavor, the substance for making the ice-cream of a different flavor is poured into said cavities in a liquid state and then frozen before the frozen hollow articles in the molds begin to melt. It is obvious that the invention may be applied to other uses than the manufacture of ice-cream.

It is now clear that I have produced an improved mold of novel construction and capable of use in a new and facile manner in order to produce the articles rapidly and without marring or damaging the articles during their manufacture; for the application of slight heat to the molds will break any adhesion that exists between the articles in the molds and permit the articles to be readily discharged from the molds in a solidified condition. It is also clear that the construction, arrangement and relationship of the elements, as well as their form and shape, may be varied within equivalent limits without departure from the nature and principle of the invention.

I do not restrict myself in any unessential respects, but what I claim and desire to secure by Letters Patent is:—

1. A mold comprising a receptacle including a bottom wall having a hole therethrough, a hollow mold in connection with the bottom wall and arranged to receive through said hole the material to be molded, a core arranged to extend to the bottom of said mold to shape the material into a cylinder having an opening therethrough from end to end, and a support for said core arranged to telescope within said receptacle after the material to be molded has been placed in the mold and thereby guide said core centrally into the mold and into contact with the bottom of the mold.

2. A mold comprising a receptacle having holes through the bottom thereof, hollow molds in connection with the bottom of the receptacle in position to receive through said holes the material to be molded, cores arranged to extend into said molds to contact with the bottoms of the molds to form openings throughout the length of the molded articles and to equalize the amount of material in the different molds, a support for said cores arranged to telescope within said receptacle after the material to be molded has been placed in the molds and thereby guide said cores centrally into the molds, and a portion in connection with said support whereby said support may be engaged and operated.

3. A device of the character described, comprising a receptacle having holes through the bottom thereof, a series of cylindrical hollow molds in connection with the bottom of the receptacle in position to receive through said holes the material to be molded, cores arranged to extend into said molds and into contact with the bottoms of the molds to form axial holes entirely through the molded articles, and means cooperating with said receptacle for guiding said cores centrally into said molds.

FLOYD L. SCHADE.